United States Patent
Yonemori et al.

(10) Patent No.: US 6,344,627 B1
(45) Date of Patent: Feb. 5, 2002

(54) PULSE WELDING EQUIPMENT AND ITS CONTROL METHOD

(75) Inventors: Shigeki Yonemori; Toshinori Hongu; Akiko Ueda, all of Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/450,998

(22) Filed: Nov. 29, 1999

(30) Foreign Application Priority Data

Nov. 27, 1998 (JP) .......................................... 10-337179

(51) Int. Cl.$^7$ ................................................. B23K 9/09
(52) U.S. Cl. ............................. 219/130.51; 219/137 PS
(58) Field of Search ...................... 219/130.51, 130.21, 219/130.31, 130.33, 130.4, 137.71, 137 PS

(56) References Cited

U.S. PATENT DOCUMENTS 3,588,466 A * 6/1971 Daggett ................... 219/130.4
5,225,660 A * 7/1993 Mita et al. ............. 219/130.51

FOREIGN PATENT DOCUMENTS

JP 4-270069 * 9/1992

* cited by examiner

*Primary Examiner*—Clifford C. Shaw
(74) *Attorney, Agent, or Firm*—Ratner & Prestia

(57) ABSTRACT

Comprising means for feeding a welding wire, means for feeding a pulse current between the welding wire and base metal, and means for controlling this pulse current feeding means, the control means controls the pulse current feeding means so as to flare up the welding wire upon arc starting, and then controls the pulse current feeding means until the pulse current becomes lower in frequency than the pulse frequency of the main welding current.

15 Claims, 4 Drawing Sheets

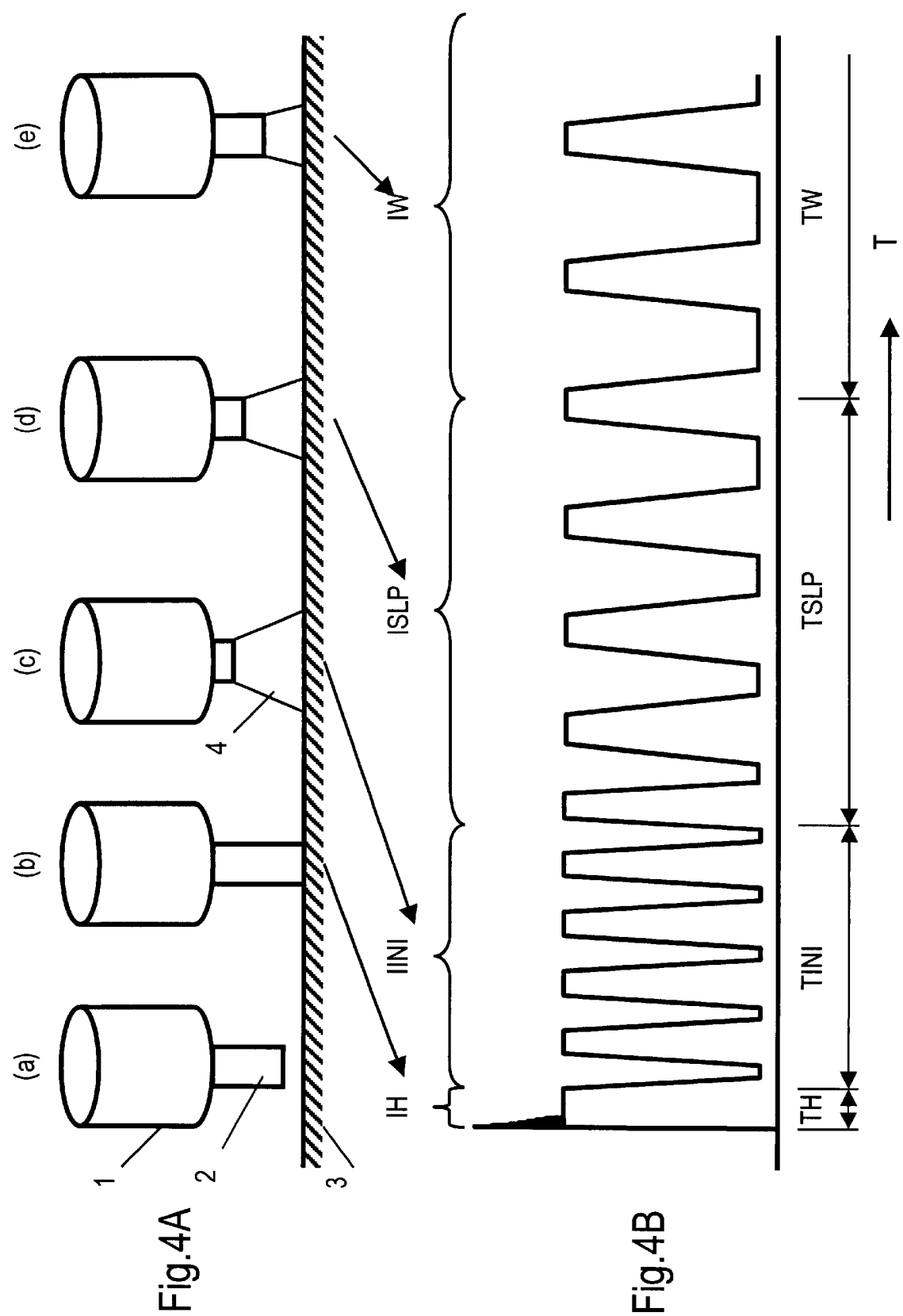

PULSE WELDING EQUIPMENT AND ITS CONTROL METHOD

FIELD OF THE INVENTION

The present invention relates to pulse welding equipment for welding by using a welding wire and outputting pulse peak current and base current alternately, and a method of controlling the same.

BACKGROUND OF THE INVENTION

A control method of pulse welding equipment of a prior art disclosed in Japanese Laid-open Patent No. 4-270069 is described below while referring to FIG. 4A and FIG. 4B. FIG. 4A shows the lapse of time relating to the position of the welding wire tip end upon arc starting and the arcing. When forming an arc 4 between a welding wire 2 supplied to a nozzle 1 at the tip end of a welding torch and a base metal 3, it shows the process consists of the following subsequent steps:

(a) a state before start of welding,
(b) a short-circuited state of welding wire 2 and base metal 3 just before arc starting,
(c) a flare-up state of welding wire 2,
(d) a transitional state until reaching a stable state of appropriate arc length for main welding, and
(e) the stable state of appropriate arc length for main welding.

On the other hand, FIG. 4B schematically shows the lapse of time of the welding current corresponding to FIG. 4A, that is:

the state (b) just before arc starting is immediately followed by a hot current output period (TH period),
an initial current output period for flaring up the welding wire 2 continues (TINI period), being followed by
a transition period to main welding current by changing from high frequency to low frequency in gradual steps (TSLP period), and
a main welding current output period (TW period).

The welding currents outputted in each period of TH, TINI, TSLP, and TW are represented by IH, IINI, ISLP, and IW respectively.

In such conventional control method of pulse welding equipment, in the process of transition of arc length from state (c) to state (e), the pulse welding frequency is changed in gradual steps from high frequency to the frequency of main welding state, and in the TSLP period (d), the arc length is gradually shortened. It helps to lower the incidence of short-circuiting between the welding wire and base metal in the course of transition from right after arc starting until the arc length of main welding condition, and decrease the generation of spatter by short-circuiting.

However, in the conventional control method of pulse welding equipment, because of the provision of TSLP period for changing from high frequency to low frequency in gradual steps, it took a long time until the arc was stabilized at a proper length for main welding. By this method, generation of spatter by short-circuiting is decreased. But, to the contrary, spatter was generated due to abnormal growth of droplets at the tip end of the welding wire 2. Further, as the welding wire 2 flares up, the state of long arc length continues for a while, and the area of the arc 4 contacting with the base metal 3 is wider. Therefor the deposition quantity of the wire 2 on the base metal 3 in unit area decreases, and the heat affected zone of the base metal 3 is widened.

SUMMARY OF THE INVENTION

It is hence an object of the invention to present pulse welding equipment for starting an arc smoothly, and its control method.

To achieve the object, the pulse welding equipment of the invention comprises:

(a) means for feeding a welding wire,
(b) means for feeding a pulse current between the welding wire and base metal, and
(c) means for controlling this pulse current feeding means;

in which the control means controls the pulse current feeding means so as to flare up the welding wire upon arc starting, and controls the pulse current feeding means until the pulse current becomes lower in frequency than the pulse frequency of the main welding current.

From flare-up of welding wire following arcing when starting welding until output of main welding current, it is designed to output a pulse current of lower frequency than the pulse frequency of main welding current.

BRIEF DESCRIPTION OF THE DRAWINGS

FIG. 4A is an explanatory diagram of lapse of time relating to the position of the welding wire tip end upon arc starting and the arcing in a prior art; and FIG. 4B is a schematic diagram of lapse of time of welding current upon arc starting in the prior art.

DETAILED DESCRIPTION OF THE EXEMPLARY EMBODIMENTS

Figure 1:
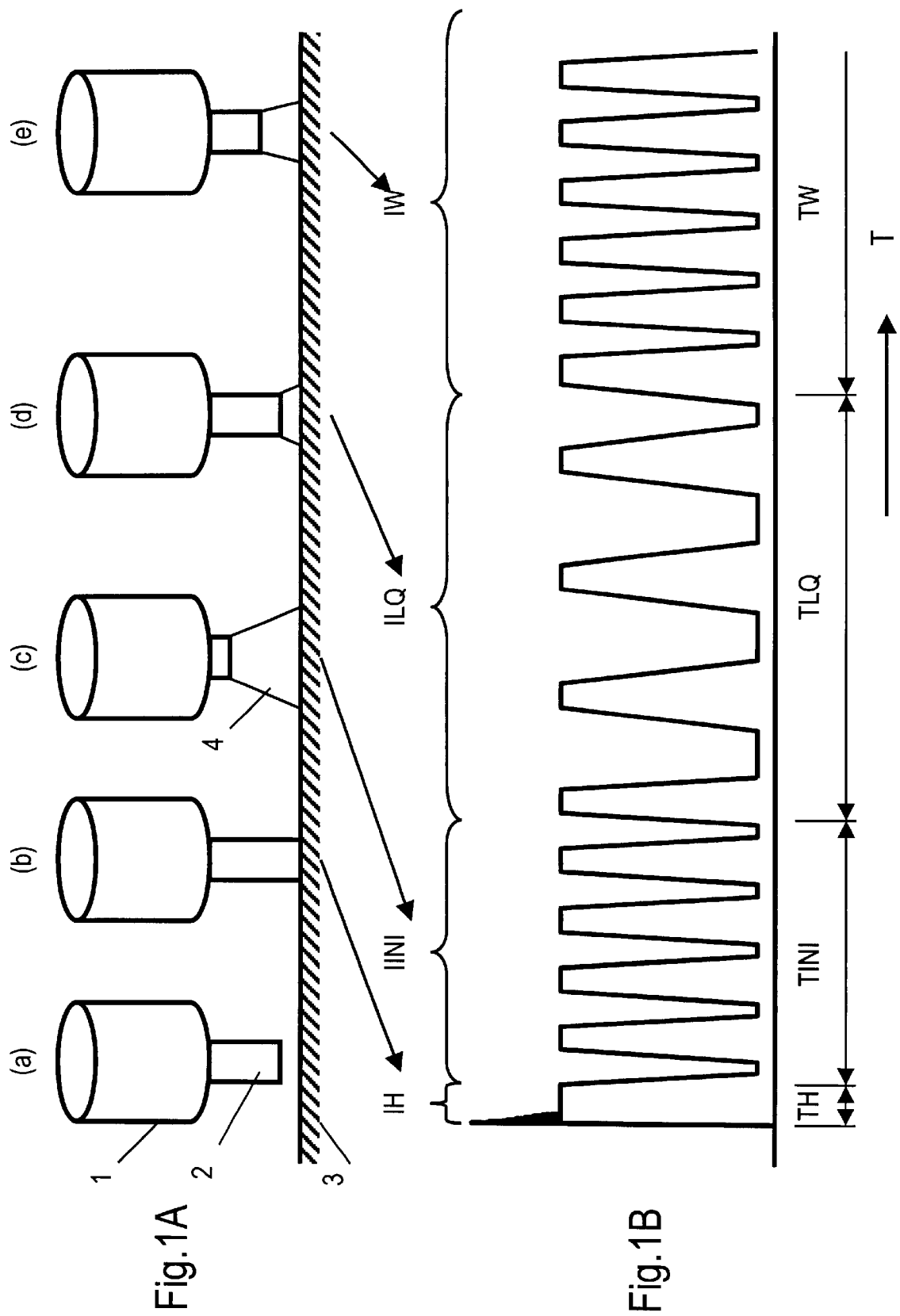
FIG. 1A is an explanatory diagram of lapse of time relating to the position of the welding wire tip end upon arc starting and the arcing in embodiment 1 of the invention.
FIG. 1B is a schematic diagram of lapse of time of welding current upon arc starting in embodiment of the invention.

Referring now to the drawings, preferred embodiments of the invention are described in detail below.

Embodiment 1

FIG. 1A shows the lapse of time relating to the position of the welding wire tip end upon arc starting and the arcing in embodiment 1, and FIG. 1B schematically shows the lapse of time of welding current corresponding to FIG. 1A. Same elements as in the prior art shown in FIG. 4A and FIG. 4B are identified with same reference numerals and detailed description is omitted.

FIG. 1A and FIG. 1B show the arc starting state. In FIG. 1A and FIG. 1B, state (a): first a welding wire 2 is fed to a base metal 3 at low speed,
state (b): it contacts with the base metal 3 in a hot current output period (TH period), and an arc is formed,
state (c): the welding wire is flared up in the initial current output period (TINI period),
state (d): the welding wire melt speed is decreased in the transitional period to main welding current (TLQ period) for controlling the welding output at a lower pulse frequency than the pulse frequency in the main welding current output period (TW), and state (e): the TW period at pulse frequency of main welding current output time (hereinafter called main welding) starts.

What this embodiment 1 differs from the prior art lies in the following points:
(a) there is the TLQ period for welding at a lower pulse frequency than the pulse frequency of main welding, and
(b) the welding wire feed speed at this time is slower than the main welding speed until TH period and TINI period, and is changed to the feed speed of main welding time after TINI period, in TW period including TLQ period.

By this means, the arc length is
(a) long in the TINI period as the welding wire 2 flares up,
(b) suddenly becomes short in the TLQ period, and
(c) is appropriate in the TW period.

Accordingly, the time from the welding wire 2 contacting with the base metal 3 until the arc is stabilized at an appropriate length is shorter, and smooth arc starting is realized. Further, since the period of the state (c) of long arc length is shorter, the heat affected zone of the base metal 3 decreases. As the period of flare-up state of the welding wire 2 is shorter, moreover, the contacting area of the arc 4 with the base metal 3 is narrower, and the arc 4 is concentrated on the base metal 3, so that the deposition quantity in the unit area of the base metal 3 is increased. In addition, it is effective to decrease the spatter due to abnormal growth of droplets at the tip end of the welding wire 2.

For example, when the welding wire material is aluminum, the welding wire diameter is 1.2 mm, and the output current is 60 A to 90 A,
 in the prior art, it takes about 420 ms from contact of the welding wire with the base metal until the arc is stabilized at an appropriate length;
 whereas in embodiment 1 it takes about 300 ms, and the time until stabilization is shortened, and the arc length is changed smoothly.

Still more, as the welding wire flares up and the period of long arc length is shortened, the period of excessive output voltage is shortened, and the heat affected zone of the base metal is narrower.

In the example presented herein, the changeover time of pulse frequency is, in the case of output current of 70 A, TH period of 15 ms, TINI period of 90 ms, and TLQ period of 200 mns.

The pulse frequency in the TLQ period is about half pulse frequency of the pulse frequency in the main welding time.
(Evaluation review 1)

Embodiment 1 of the invention was evaluated. Results are discussed while referring to Table 1. Table 1 shows the best results obtained by current command value.

TABLE 1

| | | Current command value [A] | □60 | 60 □100 | 100 □160 | 160□ |
|---|---|---|---|---|---|---|
| Welding wire diameter [mm] | ▢▢▢▢ | Pulse frequency | 0.75 | 0.50 | 0.60 | 0.80 |
| | | Duration (ms) | 100 | 200 | 150 | 150 |
| | ▢▢▢▢ | Pulse frequency | 0.90 | 0.60 | 0.70 | 0.80 |
| | | Duration (ms) | 100 | 150 | 140 | 150 |

In Table 1, the welding wire material was aluminum, and welding was done at welding wire diameter of 1.2 mm and 1.0 mm. The operation was fillet welding. This is the evaluation result of pulse frequency in the TLQ period and duration of TLQ period in FIG. 1B at each current command value in this case. The numerical value of the pulse frequency in Table 1 shows the rate when the pulse frequency at the main welding time is supposed to be 1. In the case of higher frequency than the pulse frequency of TLQ period recorded in Table 1, it is known that the effect of the invention is reduced. The effect of the invention was also sacrificed when the duration was set shorter than the TLQ period in Table 1. Or, when set shorter than the pulse frequency of the TLQ period in Table 1 or set longer than the duration of TLQ period, it is known that short-circuiting is more likely to occur between the welding wire and the base metal, possibly causing spattering.

In the prior art of control method of pulse welding equipment, there is a current region likely to induce flare-up depending on the current command value, and the arc length varies when flaring up. Depending on the welding wire diameter, moreover, the welding wire feed speed varies, and a similar flare-up current region exists, and the arc length varies when flaring up.

It is hence known from Table 1 that the effects are enhanced by varying the duration of TLQ period and pulse frequency depending on the output current.
(Evaluation review 2)

Embodiment 1 of the invention was further evaluated from a different viewpoint than in Evaluation review 1. Results are explained by referring to Table 2.

TABLE 2

| Pulse frequency | 0.5 | 1.0 | 2.0 |
|---|---|---|---|
| Bead appearance | □ | □ | x |
| Bead shape | □ | □ | o |
| Vibration | x | o | □ |

Table 2 is an evaluation table by varying the pulse frequency of TINI period in FIG. 1B, at welding wire diameter of 1.2 mm, using aluminum wires. The pulse frequency in Table 2 shows the rate when the pulse frequency in main welding condition is supposed to be 1. The evaluation in Table 2 shows the bead appearance (heat affected zone) upon arc starting, bead shape (penetration), and vibration transmitted to the torch due to contact between the welding wire 2 and the base metal 3. The evaluation is ranked in four levels: excellent (□), good (o), fair (□), and poor (x). The pulse frequency and duration of the TLQ period in FIG. 1B were evaluated according to Table 1. The duration of TH period in FIG. 1B was fixed at 15 ms, and the duration of TINI period was 90 ms, and fillet welding was conducted. It is known from Table 2 that the starting bead appearance and bead shape are improved when the pulse frequency of the TINI period is set at the pulse frequency of the main welding as compared with other frequency.

Embodiment 2

Embodiment 2 of the invention is described below while referring to FIG. 2.

This embodiment relates to a control method of starting the arc of pulse MIG (Metal Inert Gas) welding equipment by detecting the arc voltage, controlling the peak width or base width, and maintaining the arc voltage at a constant level.

Figure 2:
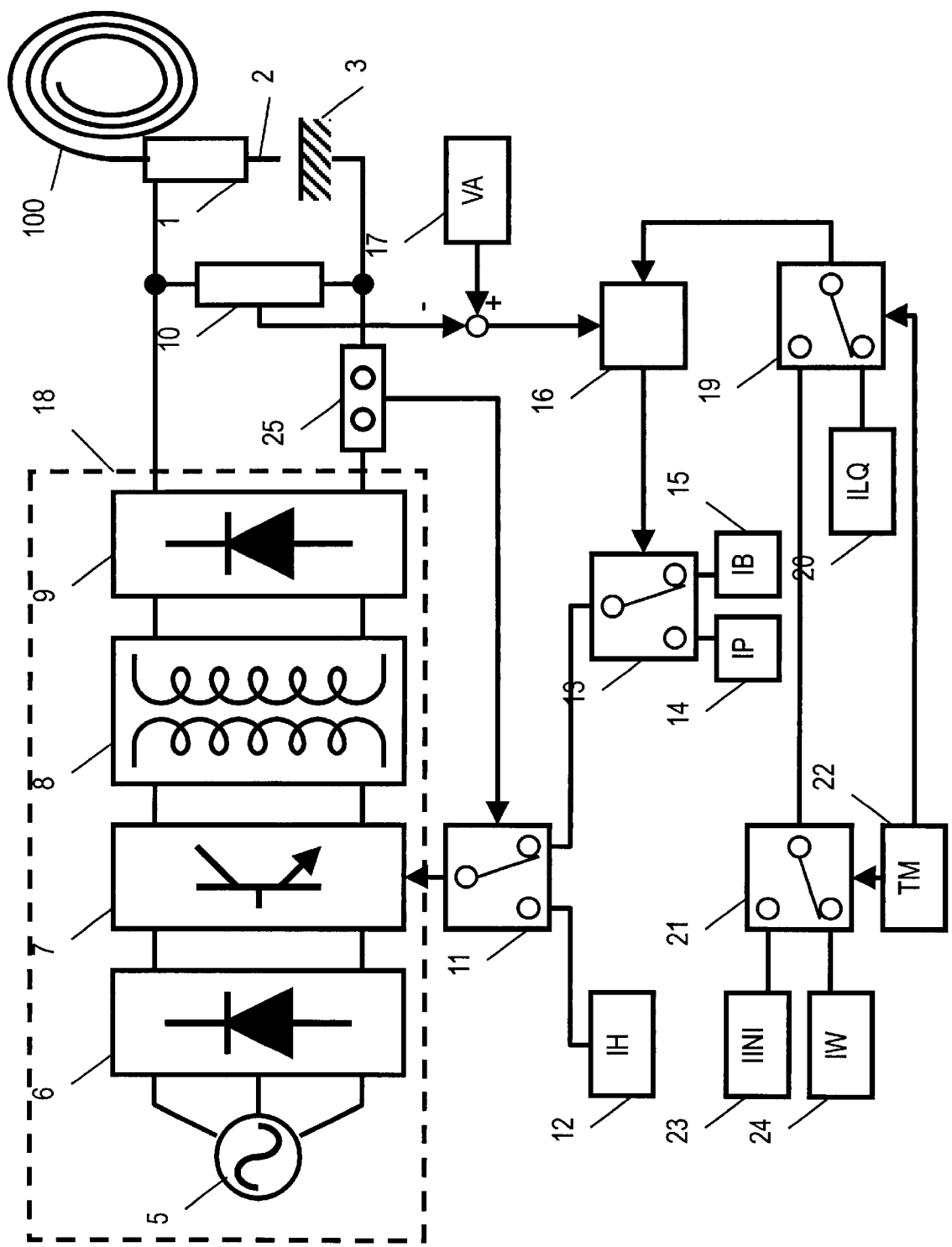
FIG. 2 is a block diagram of pulse welding equipment in embodiment 4.

In FIG. 2, the pulse MIG welding equipment of this embodiment comprises:
(a) a driving circuit 18,
(b) a current detector 25 for detecting the welding current output, (c) a voltage detector 10 for obtaining the welding voltage output, (d) a first switching element 11 for driving by obtaining a current detection signal from the current detector 25, (e) a hot current command unit (IH) 12, (f) a pulse peak current control unit (IP) 14, (g) a base current control unit (IB) 15, (h) an output voltage command unit (VA) 17, (i) a main current transitional period pulse frequency command unit (ILQ) 20 in the TLQ period in FIG. 1B, (j) a timer (TM) 22 for determining the duration of TINI period and TLQ period in FIG. 1, (k) an initial current period pulse frequency command unit (IINI) 23 in the initial current output period of TINI period, (l) a main current pulse frequency command unit (IW) 24 for outputting current during main welding, (m) a second switching element 21 and a third switching element 19 driven by the TM 22, (n) a pulse waveform operator 16 for selecting the IP 14 or IB 15 by the feedback value of output voltage command unit 17 and voltage detector 10 and the output signal of the third switching element 19, (o) a fourth switching element 13 driven by the pulse waveform operator 16, and (p) a welding wire feeder 100 for feeding a welding wire 2 to a base metal 3 through a nozzle 1.

In this constitution, the driving circuit 18 is composed of:

(a) a three-phase alternating-current power source 5, (b) a primary diode 6 for rectifying alternating-current voltage, (c) a switching element 7 for converting the rectified direct current into an alternating-current output, and driving the welding output, (d) a transformer 8 for transforming the alternating-current output, and (e) a secondary diode 9 for rectifying the transformed alternating-current output.

In thus constituted pulse MIG welding equipment of this embodiment 2, the operation is described below.

First, when starting welding, a no-load voltage is applied between the welding wire 2 and the base metal 3 by the operation of the driving circuit 18. During output of no-load voltage, the first switching element 11 selects the hot current command 12. Next, when the welding wire 2 contacts with the base metal 4, the current detector 25 detects the output current, and sends a signal to the first switching element 11. The first switching element 11, receiving a signal from the fourth switching element 13, sends it out to the switching element 7 to drive it. It is the TH period in FIG. 1 from the time of the welding wire 2 contacting with the base metal 3 until the first switching element 11 is changed over. Then, the TH period is changed over to the TINI period. In the TINI period, the fourth switching element 13 receives a signal from the pulse waveform operator 16, and outputs IP 14 and IB 15 by changing over alternately. At this time, by the signal of the TM 22, the second switching element 21 issues an output signal of the IINI 23, and the third switching element 19 issues a command signal sent out from the second switching element 21.

Consequently, the duration of the TINI period is counted by the TM 22, and upon lapse of a specific time, the third switching element 19 selects the ILQ pulse frequency signal 20, and sends a signal to the pulse waveform operator 16. At this time, the TINI period is changed over to the TLQ period. In the TLQ period, the pulse waveform operator 16 receives the ILQ pulse frequency signal and the fed-back signal, and determines the peak period and the base period. The pulse frequency during the TLQ period is the frequency of the output signal of the ILQ 20.

Then, the duration of the TLQ period is counted by the TM 22, and after a specific period, the third switching element 19 is changed over to the signal issued from the second switching element 21, and the second switching element 21 selects the output signal of IW 24 which is the main welding pulse frequency. At this time, the TLQ period is changed over to the TW period.

In this operation, the hot current is outputted in the TH period, the IINI 23 is outputted in the TINI period, and ILQ pulse frequency is outputted in the TLQ period. The transition of arc length at this time is same as in embodiment 1. By fixing the output signal of the second switching element 21 at the IW 24, the pulse frequency in the TINI period is kept same as in the main welding.

Thus, the same effects as in embodiment 1 are obtained.

Embodiment 3

Figure 3:
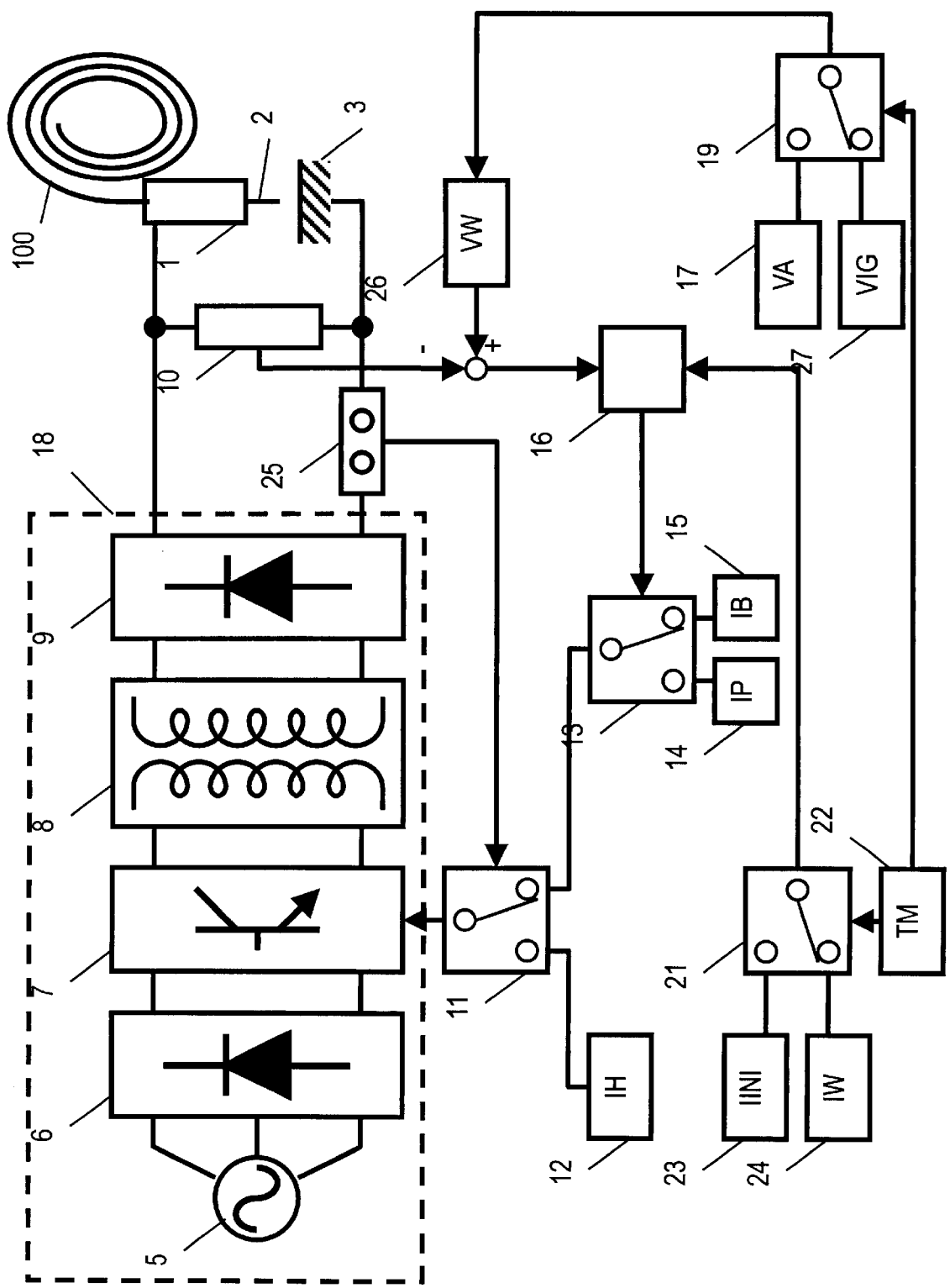
FIG. 3 is a block diagram of pulse welding equipment in embodiment 5.

Embodiment 3 of the invention is described below while referring to FIG. 3.

This embodiment 3 relates to a control method of starting the arc of pulse MIG welding equipment by detecting the arc voltage, controlling the pulse frequency, and maintaining the arc voltage at a constant level.

Same elements as shown in FIG. 2 are identified with same reference numerals, and detailed description is omitted. In FIG. 3, reference numeral 27 is a low voltage output command unit (VIG) for issuing a low voltage command to the voltage command in the TW period during main welding in the TLQ period, and reference numeral 26 is an output voltage adjusting circuit (VW) for determining the output voltage by receiving a voltage signal from the third switching element 19.

The operation is described below by reference to FIG. 3, while omitting the same operation as in FIG. 2. In the TH period, a hot current is outputted. In the TINI period, receiving the pulse frequency condition from the IINI 23, the fourth switching element 13 issues command signals to the pulse peak current command unit 14 and base current command unit 15.

In the TW period, receiving the peak width from the IW 24, the pulse frequency is controlled by changing the base current period by the feedback voltage, so that the arc voltage is kept constant.

Herein, in the TLQ period, the third switching element 19 selects the signal of the VIG 27, and sends a signal to the VW 26. The pulse waveform operator 16 receives the feedback signals of the VW 26 and voltage detector 10. At this time, since the pulse waveform operator 16 receives a feedback signal for setting lower than in main welding, the base period is extended so as to suppress the output voltage. The pulse frequency at this time is lower by the portion of extension of the base period. Thus, the arc starting in embodiment 3 is same as the operation in embodiment 2. At the same time, the same effects as in embodiment 1 are obtained.

As clear from the description herein, according to the pulse welding equipment and its control method of the invention, since the time from the flare-up state until reaching the appropriate arc length for main welding can be shortened, transition from arc starting to main welding is smooth. Moreover, since the period of flare-up state is short, the arc is concentrated on the base metal, so that the deposition quantity per unit area can be increased.

What is claimed is:

1. A pulse welding equipment comprising:
   a driving circuit for feeding a welding output between a welding wire and a base metal,
   a current detector for detecting the welding current output,
   a voltage detector for obtaining the welding voltage output,
   a first switching element for driving by obtaining a current detection signal from said current detector,
   a hot current command unit for issuing a hot current during a hot current output period right after short-circuiting of welding wire and base metal,
   a pulse peak current control unit,
   a base current control unit,
   an output voltage command unit,
   a main welding pulse frequency command unit in the main welding transitional current output period,
   a timer for determining the duration of initial current output period and said main welding transitional current output period,
   an initial current pulse frequency command unit in said initial current output period,
   a main welding pulse frequency command unit for outputting current during main welding,
   a second switching element and a third switching element driven by said timer,
   a pulse waveform operator for selecting said pulse peak current control unit and base current control unit by said output voltage command signal, the feedback value obtained from said voltage detector and the output signal of said third switching element, and
   a fourth switching element driven by said pulse waveform operator.

2. A pulse welding equipment comprising:
   driving circuit for feeding a welding output between a welding wire and a base metal,
   a current detector for detecting the welding current output,
   a voltage detector for obtaining the welding voltage output,
   a first switching element for driving by obtaining a current detection signal from said current detector,
   a hot current command unit for issuing a hot current during a hot current output period right after short-circuiting of welding wire and base metal,
   a pulse peak current control unit,
   a base current control unit,
   an output voltage command unit,
   a low voltage output command unit for issuing a lower voltage command to the voltage command during main welding in the main welding transitional current output period,
   a timer for determining the duration of initial current output period and main welding transitional current output period,
   an initial current pulse frequency command unit in said initial current output period,
   a main welding pulse frequency command unit for outputting current during main welding,
   a second switching element and a third switching element driven by said timer,
   a pulse waveform operator for selecting said pulse peak current control unit and base current control unit by said output voltage command signal and the feedback value obtained from said voltage detector,
   a fourth switching element driven by said pulse waveform operator, and
   an output voltage adjusting circuit for determining the output voltage by receiving a voltage signal from said third switching element.

3. Apparatus for pulse welding, comprising:
   a feeder for feeding a current between a welding wire and a base metal; and
   a controller for controlling said current so that said current transitions from a high frequency to an intermediate frequency lower than said high frequency to a main welding frequency higher than said intermediate frequency.

4. Apparatus for pulse welding according to claim 3, further comprising a wire feeder for feeding said welding wire.

5. Apparatus for pulse welding according to claim 4, wherein an amount of said welding wire being fed by said wire feeder is changeable.

6. Apparatus for pulse welding according to claim 5, wherein said amount of said welding wire being fed by said wire feeder is changed after changing said current to said intermediate frequency.

7. Apparatus for pulse welding according to claim 3, wherein said high frequency and said main welding frequency are substantially equal.

8. Apparatus for pulse welding according to claim 3, wherein said current transitions to said high frequency before an arc of said current is formed.

9. Apparatus for pulse welding according to claim 3, wherein said current is transitioned from said high frequency to said intermediate frequency after said welding wire is fed to said base metal and an arc of said current is formed.

10. A method of pulse welding, said method comprising the steps of:
    feeding a current between a welding wire and a base metal; and
    transitioning said current from a high frequency to an intermediate frequency lower than said high frequency to a main welding frequency higher than said intermediate frequency.

11. A method of pulse welding according to claim 10, said method further comprising the step of feeding said welding wire.

12. A method of pulse welding according to claim 11, said method further comprising the step of changing a speed at which said welding wire is fed after transitioning said current to said intermediate frequency.

13. A method of pulse welding according to claim 10, wherein said high frequency and said intermediate frequency are substantially equal.

14. A method of pulse welding according to claim 10, wherein said current transitions to said high frequency before an arc of said current is formed.

15. A method of pulse welding according to claim 10, wherein said current is transitioned from said high frequency to said intermediate frequency after said welding wire is fed to said base metal and an arc of said current is formed.

* * * * *

UNITED STATES PATENT AND TRADEMARK OFFICE
CERTIFICATE OF CORRECTION

PATENT NO.    : 6,344,627 B1　　　　　　　　　　　　　　　　　　　　　Page 1 of 1
DATED         : February 5, 2002
INVENTOR(S)   : S. Yonemori et al.

It is certified that error appears in the above-identified patent and that said Letters Patent is hereby corrected as shown below:

<u>Title page,</u>
Item [56], References Cited, add the following:
-- FOREIGN PATENT DOCUMENTS
2 269 949     2/1994     Great Britain
2 269 495     2/1994     Great Britain
OTHER PUBLICATIONS
European Search Report dated March 22, 2000, application no. 99308676. --

Signed and Sealed this

Twenty-fifth Day of March, 2003

JAMES E. ROGAN
*Director of the United States Patent and Trademark Office*